United States Patent
Rudduck

(10) Patent No.: US 7,036,203 B2
(45) Date of Patent: May 2, 2006

(54) INTERNAL JIGGING

(75) Inventor: Dickory Rudduck, Seaforth (AU)

(73) Assignee: Telezygology, Inc., Chicago, IL (US)

( * ) Notice: Subject to any disclaimer, the term of this patent is extended or adjusted under 35 U.S.C. 154(b) by 0 days.

(21) Appl. No.: 10/663,978

(22) Filed: Sep. 17, 2003

(65) Prior Publication Data
US 2006/0066018 A1 Mar. 30, 2006

Related U.S. Application Data

(63) Continuation of application No. PCT/AU02/00322, filed on Mar. 20, 2002.

(30) Foreign Application Priority Data

Mar. 20, 2001 (AU) .................................... PR3851

(51) Int. Cl.
*B23P 21/00* (2006.01)
*B25B 27/14* (2006.01)

(52) U.S. Cl. .............. 29/469; 29/464; 29/468; 29/469; 29/453; 29/450; 29/525; 29/559; 29/281.1; 29/281.5; 403/324; 403/521; 403/275; 403/277; 403/322.1; 403/322.3; 403/290; 403/316; 403/DIG. 1

(58) Field of Classification Search ................ 29/464, 29/468, 453, 450, 525, 559, 469, 281.1, 281.5; 403/251, 275, 277, 322.1, 290, 322.3, 316, 403/DIG. 1, 324
See application file for complete search history.

(56) References Cited

U.S. PATENT DOCUMENTS

| | | | | |
|---|---|---|---|---|
| 3,504,424 A | * | 4/1970 | Brown | 29/430 |
| 3,697,104 A | * | 10/1972 | Soulie et al. | 403/168 |
| 3,962,774 A | * | 6/1976 | Noro | 29/432 |
| 4,042,307 A | * | 8/1977 | Jarvis | 403/290 |
| 4,169,308 A | * | 10/1979 | Minogue | 29/407.1 |
| RE30,154 E | * | 11/1979 | Jarvis | 403/290 |
| 4,340,100 A | | 7/1982 | Anderson | |
| 4,382,711 A | * | 5/1983 | Lafosse et al. | 403/290 |
| 4,402,116 A | * | 9/1983 | Schenck | 24/662 |
| 4,583,432 A | * | 4/1986 | Bricker | 82/1.11 |
| 4,683,634 A | * | 8/1987 | Cole | 29/412 |
| 4,826,345 A | | 5/1989 | Salice | |
| 5,036,586 A | | 8/1991 | Glickenberger | |
| 5,039,138 A | * | 8/1991 | Dickirson | 285/314 |
| 5,040,915 A | * | 8/1991 | Stuart et al. | 403/322.3 |
| 5,241,451 A | * | 8/1993 | Walburn et al. | 361/785 |
| 5,314,280 A | | 5/1994 | Gagliardi et al. | |
| 5,410,855 A | | 5/1995 | Clausen et al. | |
| 5,439,310 A | * | 8/1995 | Evenson et al. | 403/321 |
| 5,784,966 A | * | 7/1998 | Brown et al. | 104/304 |
| 5,895,189 A | * | 4/1999 | Ruckert | 411/535 |
| 5,974,978 A | * | 11/1999 | Brown et al. | 104/304 |

(Continued)

FOREIGN PATENT DOCUMENTS

AU 87572/75 AM 12/1975

(Continued)

*Primary Examiner*—Essama Omgba
(74) *Attorney, Agent, or Firm*—Wilmer Cutler Pickering Hale and Dorr LLP

(57) ABSTRACT

A jigging device, for example, for positioning parts to facilitate assembly line procedures. The jigging device maintains a first element (10) in a desired spatial relationship with a second element (12). The jigging device has a first fastening means comprising fastener (20) which is connected to the first element (10). The jigging device also has a second fastening means comprising fastener insert (14) together with adjustable capsule (18). Locking pin (22) locks fastener (20) to the adjustable capsule (18).

21 Claims, 13 Drawing Sheets

U.S. PATENT DOCUMENTS

| | | | |
|---|---|---|---|
| 6,230,385 B1 * | 5/2001 | Nelson | 29/450 |
| 6,260,321 B1 * | 7/2001 | Rudduck | 52/474 |
| 6,308,394 B1 * | 10/2001 | Boe | 29/450 |
| 6,470,555 B1 * | 10/2002 | Boe | 29/450 |
| 6,497,433 B1 * | 12/2002 | Ketcham | 285/45 |
| 6,796,014 B1 * | 9/2004 | Sarh | 29/407.09 |
| 6,901,646 B1 * | 6/2005 | Yoon | 29/453 |
| 2003/0131465 A1 * | 7/2003 | Yoon | 29/453 |
| 2004/0205953 A1 * | 10/2004 | Marume et al. | 29/464 |

FOREIGN PATENT DOCUMENTS

| | | | |
|---|---|---|---|
| AU | 46835/79 A | | 11/1979 |
| GB | 2026084 A | * | 1/1980 |
| GB | 2250332 A | * | 6/1992 |
| JP | 09279737 A | | 10/1997 |
| WO | WO 99/47819 | | 9/1999 |

* cited by examiner

FIGURE 6
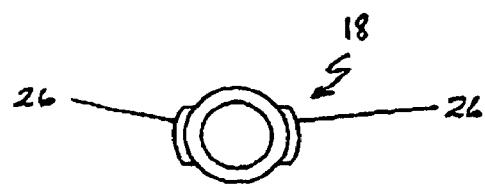
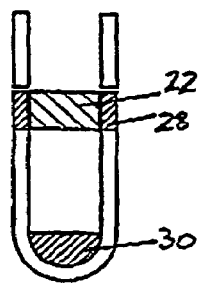
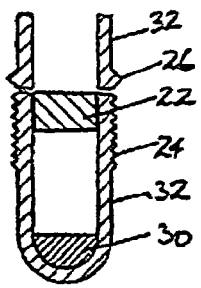
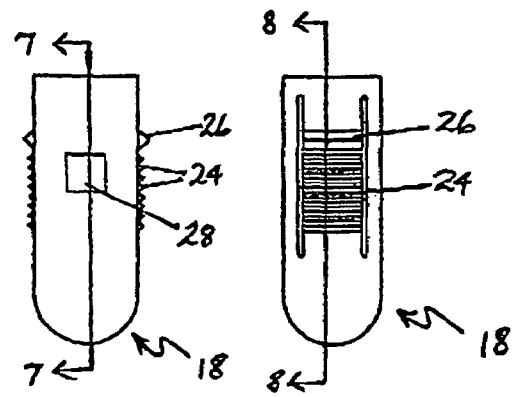
FIGURE 7   FIGURE 8   FIGURE 5   FIGURE 4
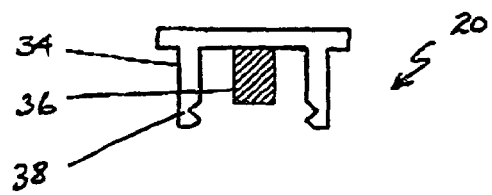
FIGURE 9

FIGURE 10
FIGURE 11
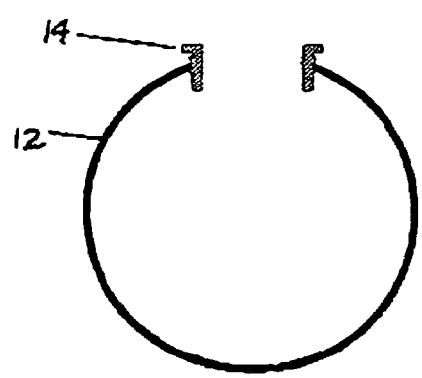
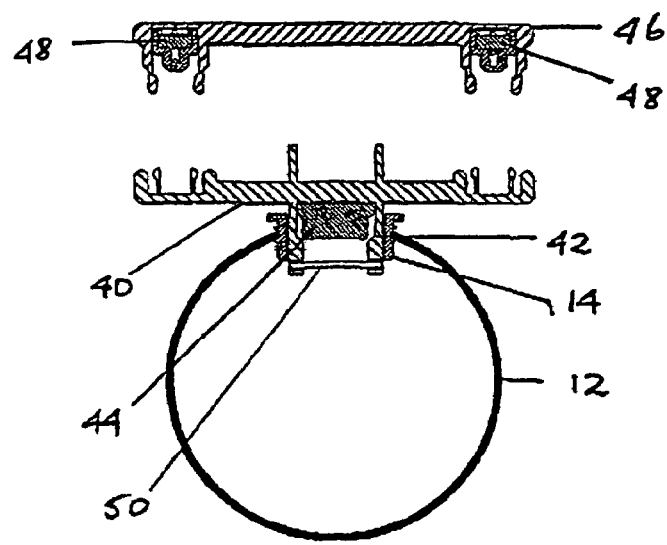
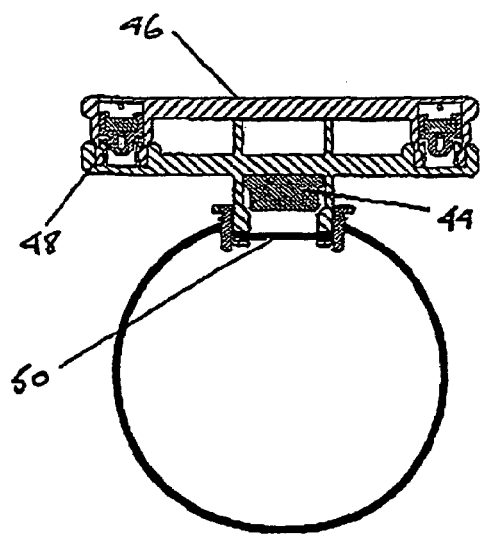
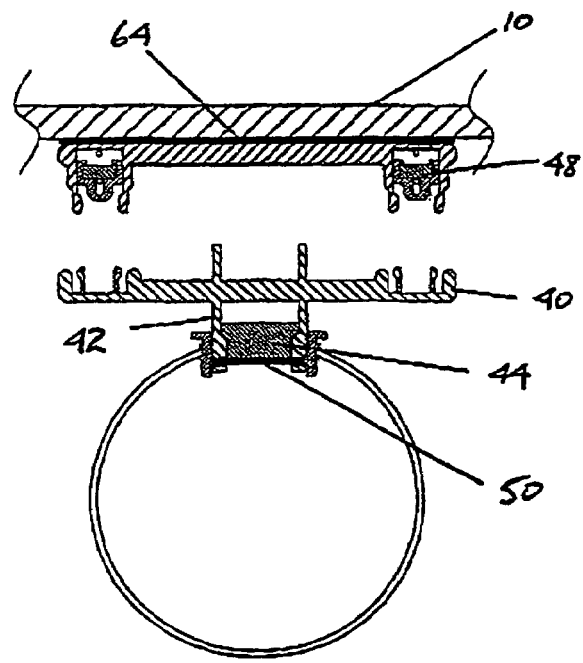
FIGURE 12
FIGURE 13

FIGURE 17
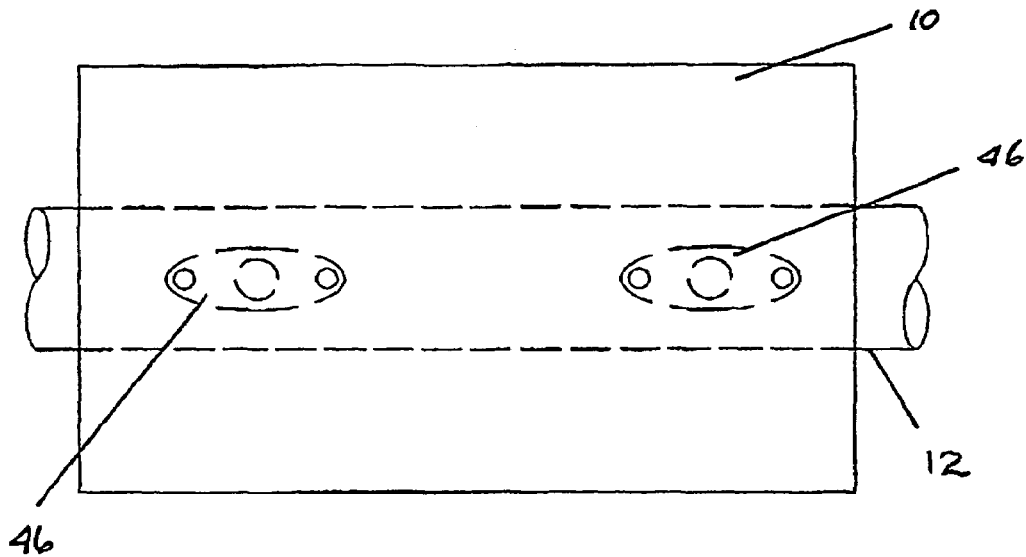
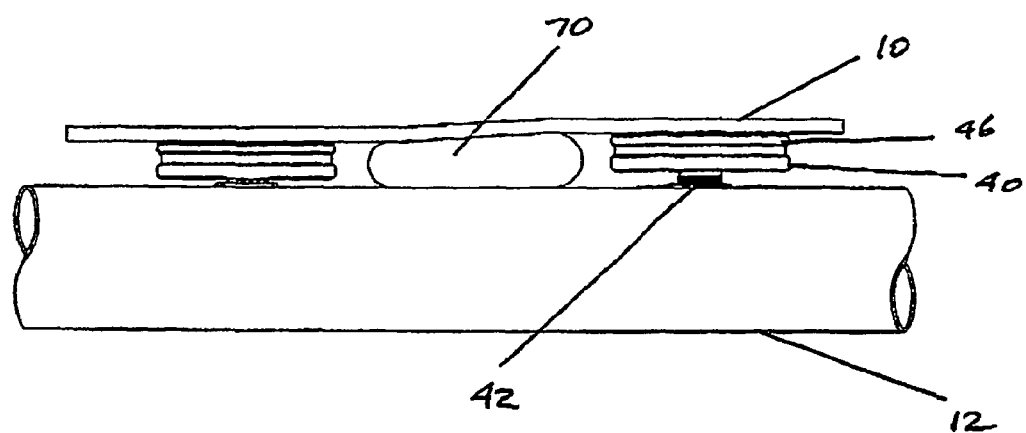
FIGURE 18

FIGURE 19
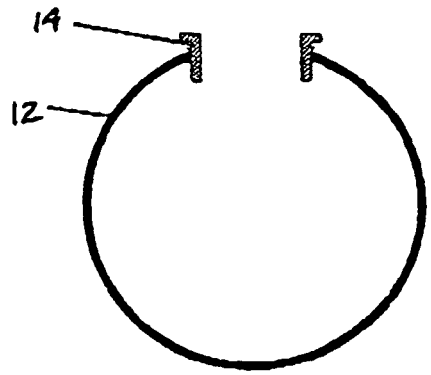
FIGURE 20
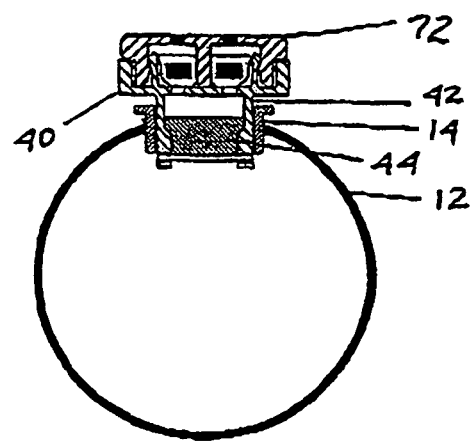
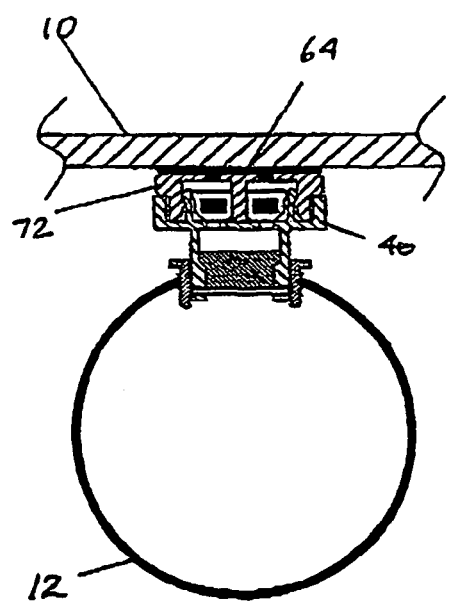
FIGURE 21
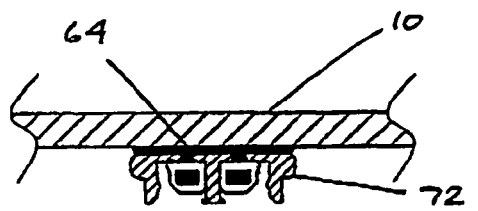
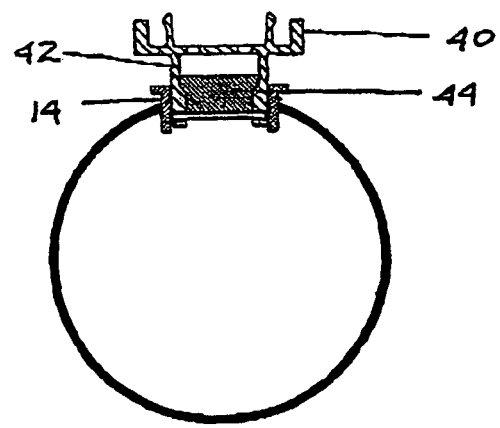
FIGURE 22

FIGURE 27
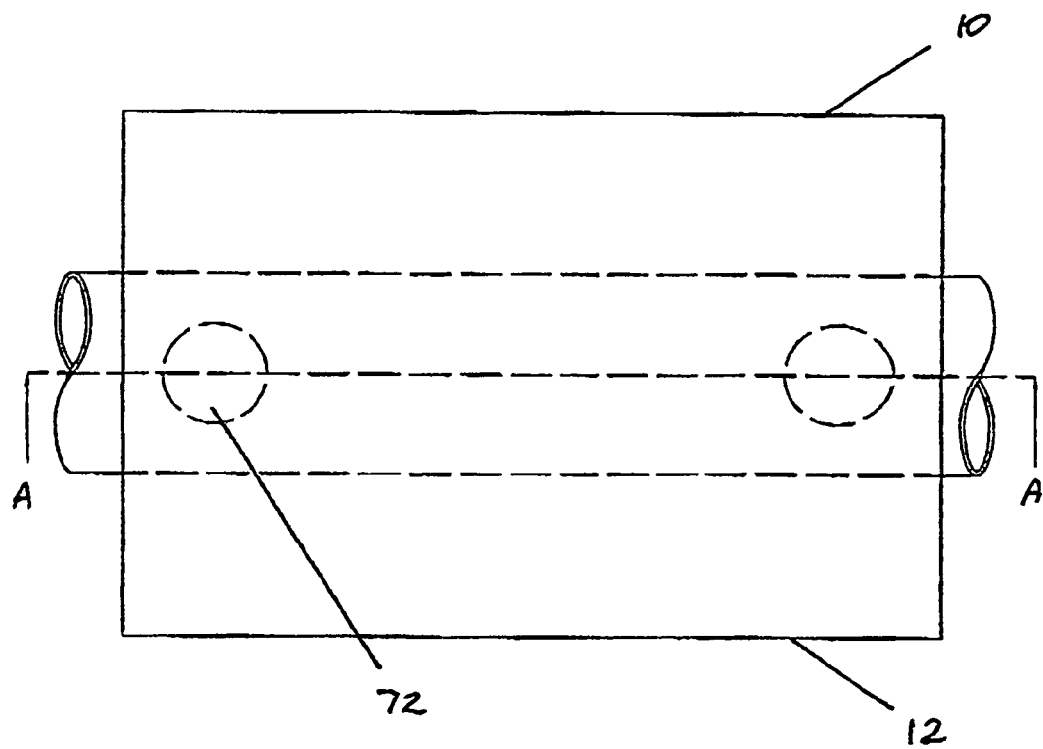
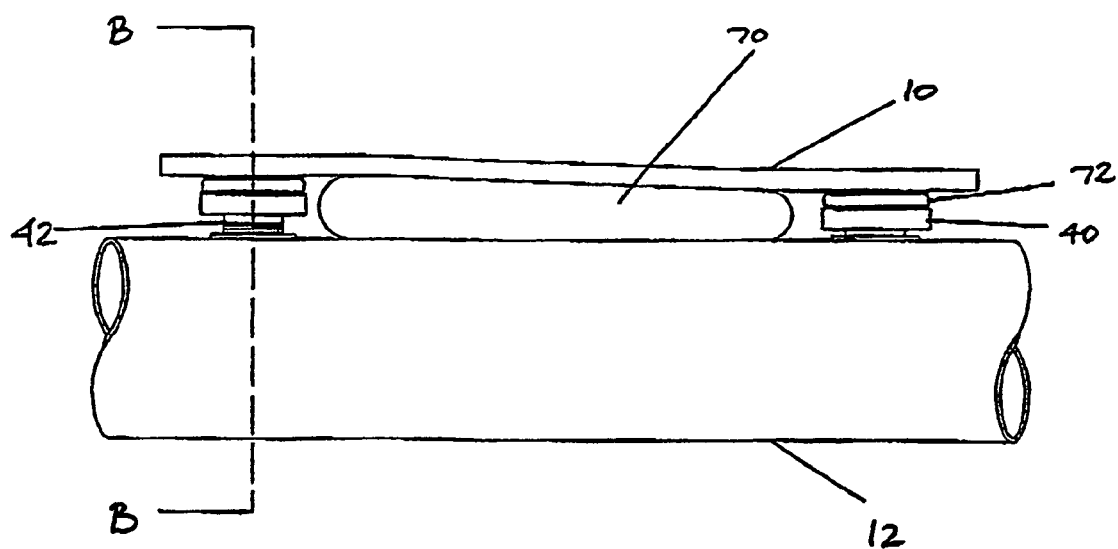
FIGURE 28

INTERNAL JIGGING

RELATED APPLICATION

This application is a continuation of International Application No. PCT/AU02/00322, filed Mar. 20, 2002, which was published under PCT Article 21(2) in English and is incorporated herein by reference. International Application No. PCT/AU02/00322 claims priority from Australian Patent Application No. PR 3851, filed Mar. 20, 2001, which is also incorporated herein by reference.

TECHNICAL FIELD

This invention relates to jigs and jigging devices. In particular this invention relates to jigging devices which may be regarded as internal and permanent compared to known jigging arrangements.

The invention also relates to a novel method of jigging.

BACKGROUND ART

Jigs and jigging devices are generally well known and widely used in manufacture. Typically, a jig will have various reference surfaces and/or points to permit accurate alignment of parts or tools. It is common to jig parts during many manufacturing processes, so that the parts are held in correct juxtaposition during such processes as punching, riveting, welding, gluing or curing. Jigs are regarded as an essential part of the manufacturing process and represent a significant part of the cost of manufacture as well as demanding logistical consideration during production.

Most jigging processes are carried out using jigs which are external to the object being formed. Such prior art jigging processes often require clamps, temporary braces or profiles of the final form of the object.

Some of the problems presented by prior art jigging can be described, by way of example, in connection with the manufacture of steel-framed vehicles. In the manufacture of such vehicles, in this example the frame is tubular and panels for the vehicle are glued to the frame. During the adhesion process, it is necessary to adjust one panel relative to another and to hold the panels in the correct position while the adhesive cures. In the past, this has been achieved by the use of external clamps, etc. There are drawbacks with the use of clamps, however. For example, clamps must be carefully removed and returned to the panel assembly station, complicating production line issues, Often, damage is caused to the panels due to the pressure required to hold the parts together. Clamps do not contribute to the final assembly strength. In addition, their presence precludes painting and access to other production line issues, such as cabling.

In many instances, it is not possible to progress the vehicle along an assembly line until the adhesive has cured. This results in inefficiency in the manufacturing process, with a costly time delay and/or the need for multiple adhesive stations.

DISCLOSURE OF THE INVENTION

It is an aim of the present invention to provide a jigging device and a method of jigging which, at least in some embodiments, can allow parts to be positioned using internal, not external, means. It is a further aim of this invention, in some embodiments, to enable automated and programmed tolerance control during the pre-assembly process.

It is a further aim to provide jigging which need not be removed, so that assembly line procedures can continue uninterrupted.

Accordingly, this invention provides a jigging device for maintaining a first element in spatial relationship to a second element, the device including a first fastening means for connection to the first element and a second fastening means for connection to the second element, at least one of the first and second fastening means including adjustment means for adjusting the spatial relationship between the first and second elements, characterized in that the first fastening means has a portion adapted for receipt in a portion of the second fastening means, the device also including locking means adapted to assume a position in which the first fastening means is locked to the second fastening means, the locking means in the locked position being located within the portion of the first fastening means received within the portion of the second fastening means and adapted to press the received portion of the first fastening means outwardly against the receiving portion of the second fastening means.

The invention also includes a jigging method for maintaining a first element in spatial relationship to a second element, the method including the steps of:

(1) connecting a first fastening means to the first element;
(2) connecting a second fastening means to the second element;
(3) adjusting the spatial relationship of the first element to the second element via adjustment means; and
(4) inserting a portion of the first fastening means in a portion of the second fastening means; and
(5) causing a locking means to move to a position within the first fastening means where the locking means presses outwardly against the portion of the first fastening means inserted in the second fastening means, thus locking the first fastening means to the second fastening means.

Preferably, step (5) is followed by step (6) in which the first element is connected to the second element via adhesion, welding or a similar manufacturing process.

It is to be understood that in the jigging method of the invention, the steps can be carried out in an order different from that set out above. By way of example, step (2) can be carried out after step (3).

The first element and the second element can be chosen from a wide variety of options. By way of example, in the manufacture of framed vehicles, the first element may be part of a tubular frame for the vehicle, while the second element may be a panel. Using the jigging device or method of the invention, the panel may be adjusted in any desired spatial relationship to the frame. For example, the panel may be adjusted to be closer to or further away from the frame. The panel may be adjusted so as to be closer to or further away from an adjacent panel.

The first and second fastening means and the adjustment means may similarly be chosen from a wide variety of options, as can the locking means. While it is to be understood that the first and second fastening means, the adjustment means and/or the locking means may be manipulated manually or presented in a relatively unsophisticated form, it is preferred that the locking means, at least, can be activated, to be locked or unlocked, remotely. In this regard, the contents of international patent application No. PCT/AU99/00185 are imported herein by reference. This specification discloses various forms of locking means and remote activation for such locking means and adjustment means.

It is an option with the jigging device and method of the invention that the adjustment means may be associated more with one fastening means than the other. It is a further option that a first adjustment means is associated with the first fastening means and a second adjustment means is associated with the second fastening means, enhancing the ways in which the spatial relationship can be changed.

Using the jigging device and method of the invention, it is possible to adjust one element such as a panel in an exact spatial relationship with a second element such as a steel frame, release the first element from the second element and relocate the same panel or a substitute panel (if the first panel is damaged) in the exactly required location on the frame. Further, it is possible, after the respective elements have been located in the correct position, to remove one of the elements, apply adhesive and replace that element, once again in the exact required location. In this embodiment, the jigging device of the invention will hold the first element in the correct location with respect to the second element while the adhesive cures.

The fastening means may be connected to the element in any desired way, including by using adhesive, by using a collar into which the fastening means can be fitted, by using double-sided tape (of suitable peel strength), by otherwise attaching the first fastening means to the element, or by moulding or forming the fastening means in or on the element.

The adjustment means may provide adjustment in any desired manner. By way of example, the adjustment means may have a series of serrations or a screw thread, in each case adapted to be received in a complementary shape. By way of further example, the adjustment means may have first and second parts, one being able to slide into the other to permit adjustment.

While the jigging device of the invention can incorporate locking means working along the same principle as the fastening and release systems of international patent application No. PCT/AU99/00185, it is a further option that the jigging device of the invention may be "intelligent"-namely, the jigging device may possess means which enables automated adjustment of the first element relative to the second element. By way of example, the intelligent means may be capable of sensing an undesirable gap between adjacent panels and of automatically activating the adjustment means to close the gap so that it falls within a preset tolerance. In this way, panels, etc, can become self-adjusting.

It is also to be understood that the jigging device and method of the invention can be used in different ways. The jigging device can be used to temporarily fasten one element to another, while enabling the accurate positioning of the elements. Once the correct position of the elements has been achieved, one element can be locked to the other by use of the jigging device of the invention. Optionally, the jigging device can permit disassembly of the elements while potentially maintaining the correct setting. On this basis, when the elements are assembled again, they immediately are located in the correct, predetermined, relative position.

BRIEF DESCRIPTION OF THE DRAWINGS

The invention will now be described in relation to certain non-limiting embodiments illustrated in the attached drawings, in which:

FIGS. 4 to 9 illustrate in more detail and in magnified view some of the parts of the embodiment shown in FIGS. 1 to 3;

FIGS. 10 to 13 illustrate in cross-sectional view a second embodiment of the jigging device and method of the invention;

FIG. 17 is a top view of the second embodiment;

FIG. 18 is a side elevation of the second embodiment;

FIGS. 19 to 22 show in cross-sectional view a third embodiment of the jigging device and method of the invention;

FIG. 27 shows a top view of the third embodiment; and

FIG. 28 shows a side elevation of the third embodiment.

DETAILED DESCRIPTION

Figure 1:
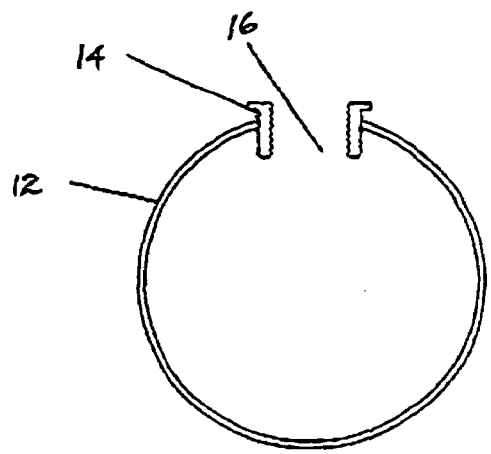
FIGS. 1 to 3 illustrate, in cross-sectional view, a first embodiment of the jigging device and method of the invention.
Figure 2:
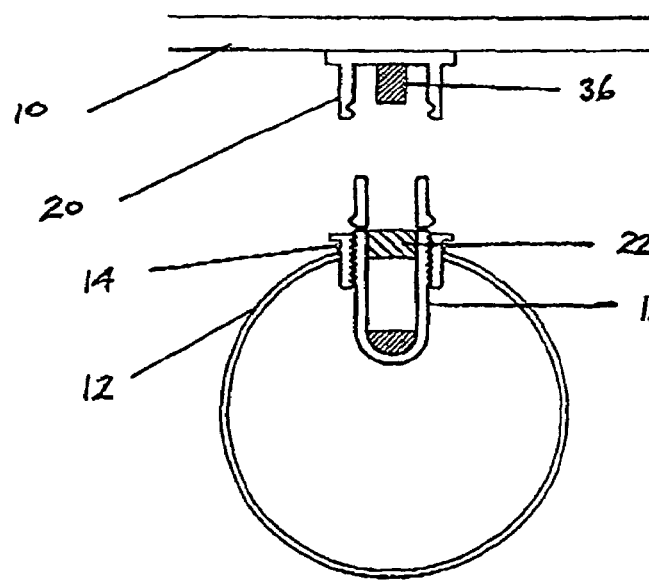
Figure 3:
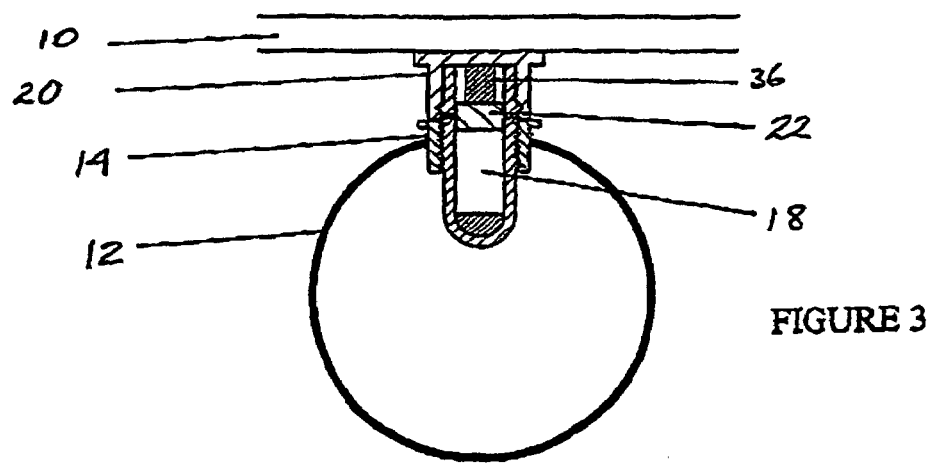

FIGS. 1 to 3 show a first element (panel 10) being maintained in a spatial relationship with a second element (tubular steel frame 12). FIG. 1 shows fastener insert 14 inserted in an opening 16 provided for the purpose in tubular steel frame 12. As can be seen from FIG. 2, fastener insert 14 together with adjustable capsule 18 make up the second fastening means. The first fastening means comprises panel fastener 20 which is shown in FIG. 2 attached (for example, by glue) to panel 10.

As can be seen from FIG. 3, after adjustable capsule 18 is adjusted in the desired way within fastener insert 14, panel fastener 20 can be attached to adjustable capsule 18 and locked in place by locking pin 22.

Adjustable capsule 18 is shown in more detail in FIGS. 4 to 8, while panel fastener 20 is shown in close-up view in FIG. 9. As can be seen from FIGS. 4 and 5, adjustable capsule 18 has a series of serrations 24 and a locking rim 26 and includes keeper 28.

FIG. 8 is a cross-sectional view taken along the lines 8—8 of FIG. 4, while FIG. 7 is a cross-sectional view taken along the lines 7—7 of FIG. 5. As well as keeper 28, the adjustable capsule 18 includes keeper 30. Locking pin 22 is shown located in the region of keeper 28.

A top view of adjustable capsule 18, as shown in FIG. 5, can be seen in FIG. 6.

With reference to FIG. 8, walls 32 of adjustable capsule 18 are capable of flexing inwardly where not prevented by locking pin 22.

Panel fastener 20, shown in FIG. 9, includes ridged cylindrical wall 34 and a further keeper 36.

To operate this first embodiment, fastener insert 14 is positioned within tubular steel frame 12, preferably by adhesion. Adjustable capsule 18 is placed within fastener insert 14, with locking pin 22 in the position shown in FIG. 2. Panel fastener 20 is attached to panel 10, once again, preferably by adhesion. Adjustable capsule 18 is adjusted with reference to fastener insert 14 so that, when panel fastener 20 is attached, panel 10 will be at the required distance from tubular steel frame 12. Panel fastener 20 is then attached to adjustable capsule 18 by a push fit, rigid cylindrical wall 34 causing flexible wall 32 to flex inwardly so that locking rim 26 is located in notch 38 (see FIG. 9) of panel fastener 20. Locking pin 22 is caused to move upwardly until it contacts keeper 36 as shown in FIG. 3. In this position, locking pin 22 maintains locking rim 26 in notch 38 and effectively locks panel fastener 20 to adjustable capsule 18, thus also maintaining panel 10 in the desired relationship to tubular steel frame 12. Locking pin 22 can be caused to move by any desired means, preferably remote, such as by use of a radio, magnetic or electronic signal or in any other suitable manner, such as is described in international patent application No. PCT/AU99/00185.

Referring now to FIGS. 10 to 14, once again fastener insert 14 is shown inserted in tubular steel frame 12 (FIG. 10). However, in this embodiment the first element is panel 10, while the second element is frame 12. Adjustable plate 40 having neck 42 is positioned within fastener insert 14. Locking pin 44 is at this stage in the unlocked position (refer to FIGS. 11 and 12). Panel plate 46 having locking pins 48 is then inserted in position on adjustable plate 40, which is adjusted as to the correct height for the relationship between panel 10 and tubular steel frame 12 (FIG. 12). Once the correct height has been adjusted, adjustable plate 40 is locked into place within fastener insert 14 by causing locking pin 44 to abut keeper 50, as shown in FIG. 13. Panel plate 46 is removed from adjustable plate 40, adhered to panel 12 and then reinserted in adjustable plate 40. If desired, locking pins 48 can be caused to lock panel plate 46 into position. As a further option, adhesive may now be inserted generally between panel 10 and tubular steel frame 12. This is further illustrated in FIGS. 15 and 16, which are a longitudinal cross-section taken at right angles to the views in FIGS. 10 to 14.

Figure 14:
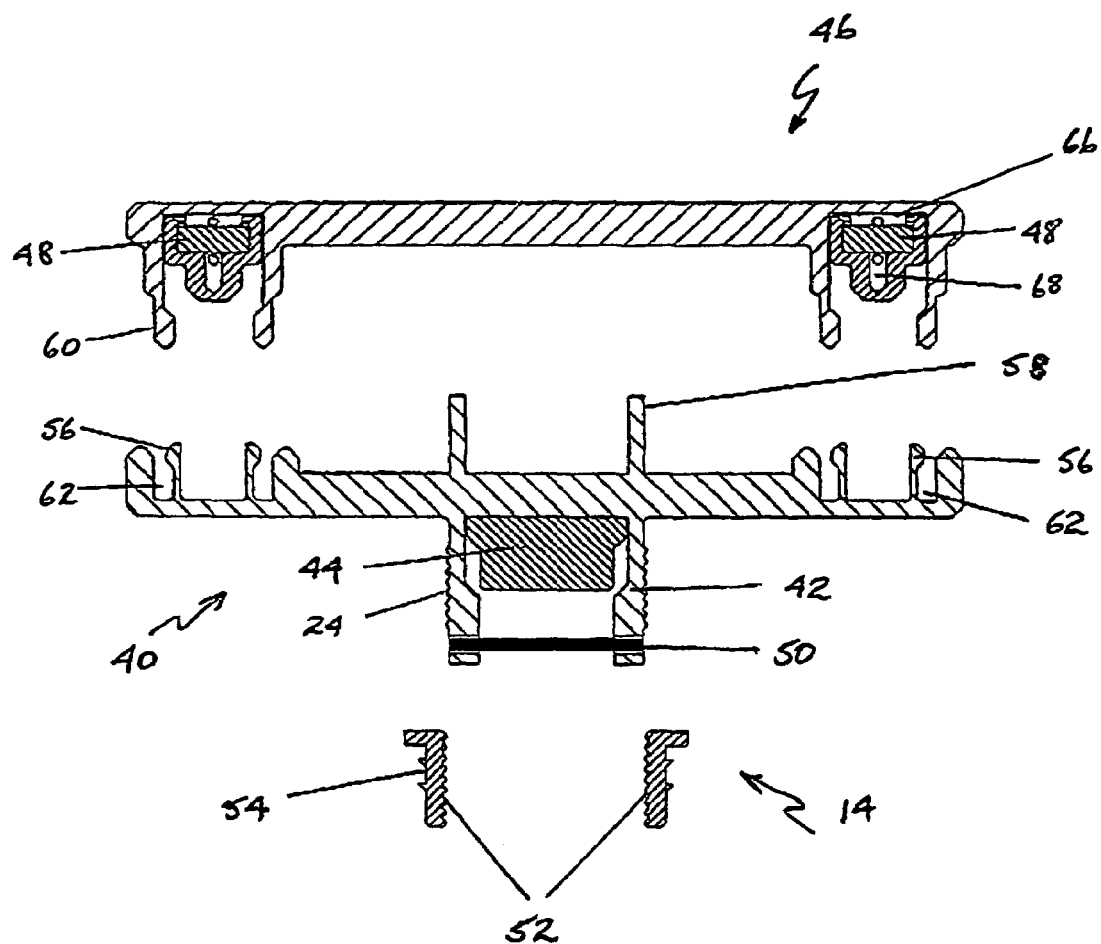
FIG. 14 is a magnified view of the second embodiment.

FIG. 14 shows in close-up view fastener insert 14, adjustable plate 40 and panel plate 46. As is the case in the first embodiment (for example in FIG. 1), fastener insert 14 includes internal serrations 52. Channel 54 is for location of tubular steel frame 12. Adjustable plate 40 has serrations 24 complementing internal serrations 52 on fastener insert 14. Keeper 50 maintains the legs of neck 42 in position. Adjustable plate 40 also includes resilient legs 56 and spacing legs 58. Resilient legs 56 are designed to lock legs 60 on panel plate 46 in channels 62. Panel plate 46, which is attached by adhesive 64 to panel 10 in FIG. 13, includes locking pins 48 having keepers 66 and 68. Adjustable plate 40 is locked to tubular steel frame 12 by causing lucking pin 44 to travel downwardly to abut keeper 50, as shown in FIG. 13. Panel plate 46 is locked to adjustable plate 40 by causing locking pins 48 to move downwardly from the position shown in FIG. 11 to that in FIG. 12, for example. As before, the locking of locking pins 44 and 48 is optionally reversible by use of remote activation means.

Figure 15:
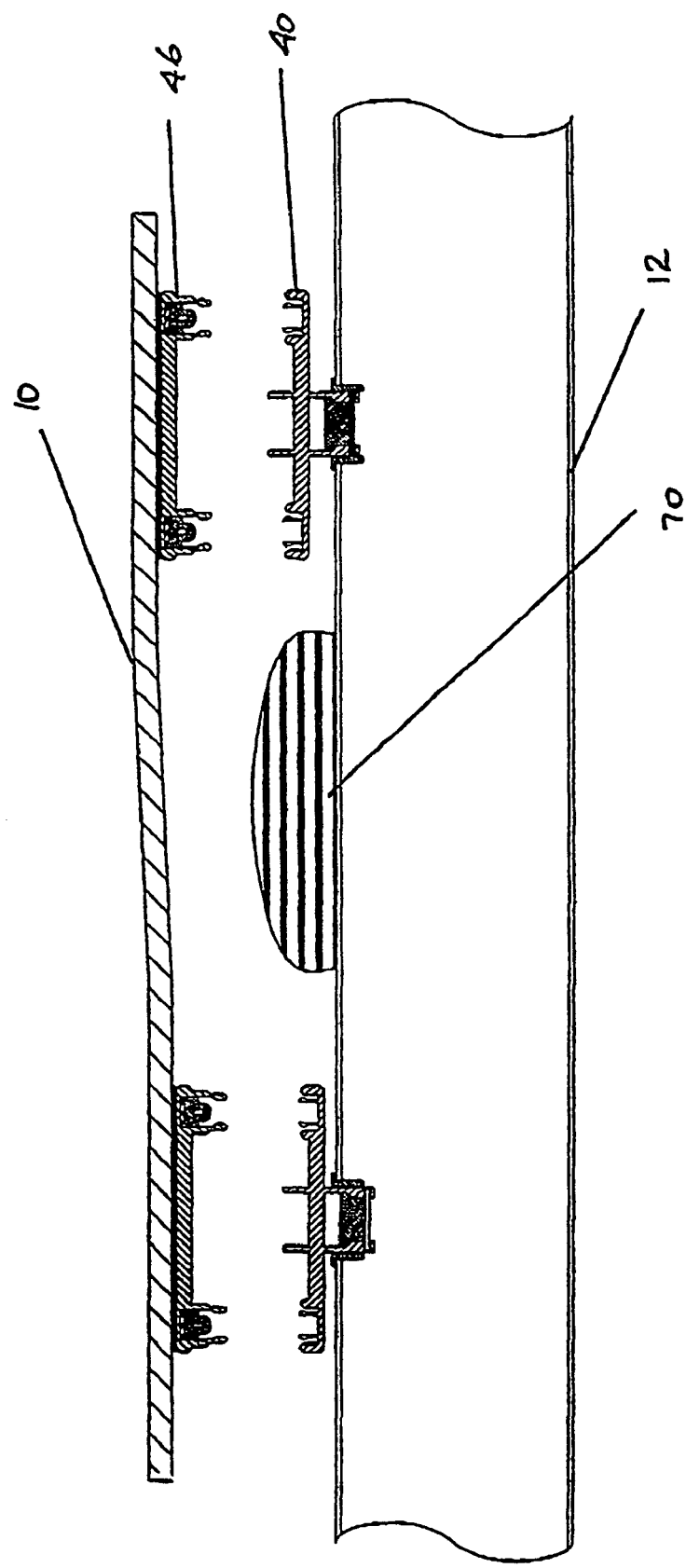
FIGS. 15 and 16 show the second embodiment in longitudinal cross-sectional view.
Figure 16:
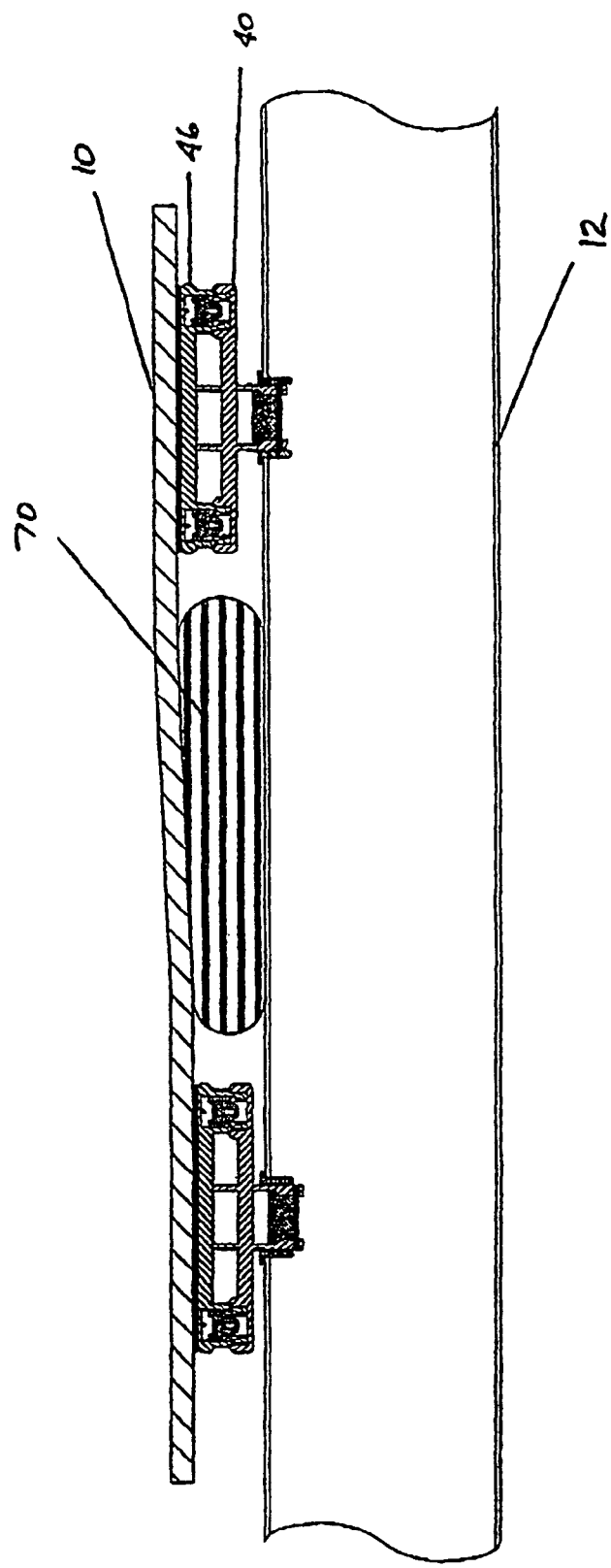

As seen from FIGS. 15 and 16, a large quantity of adhesive 70 can be deposited on tubular steel frame 12 after panel plate 46 is unlocked from adjustable plate 40 for this purpose. Panel plate 46 is then locked into position in adjustable plate 40 to maintain the desired spatial relationship between panel 10 and tubular steel frame 12 while adhesive 70 cures (refer FIG. 16).

A top view of the second embodiment is shown in FIG. 17 and a side elevation in FIG. 18.

The third embodiment is shown in FIGS. 19 to 28. This embodiment is similar to the previous embodiment and like parts will be labelled with like numbers. However, whereas the previous embodiment showed a double fastener via locking pins 48 in panel plate 46, the present embodiment has a single fastener with two locking pins.

Figure 26:
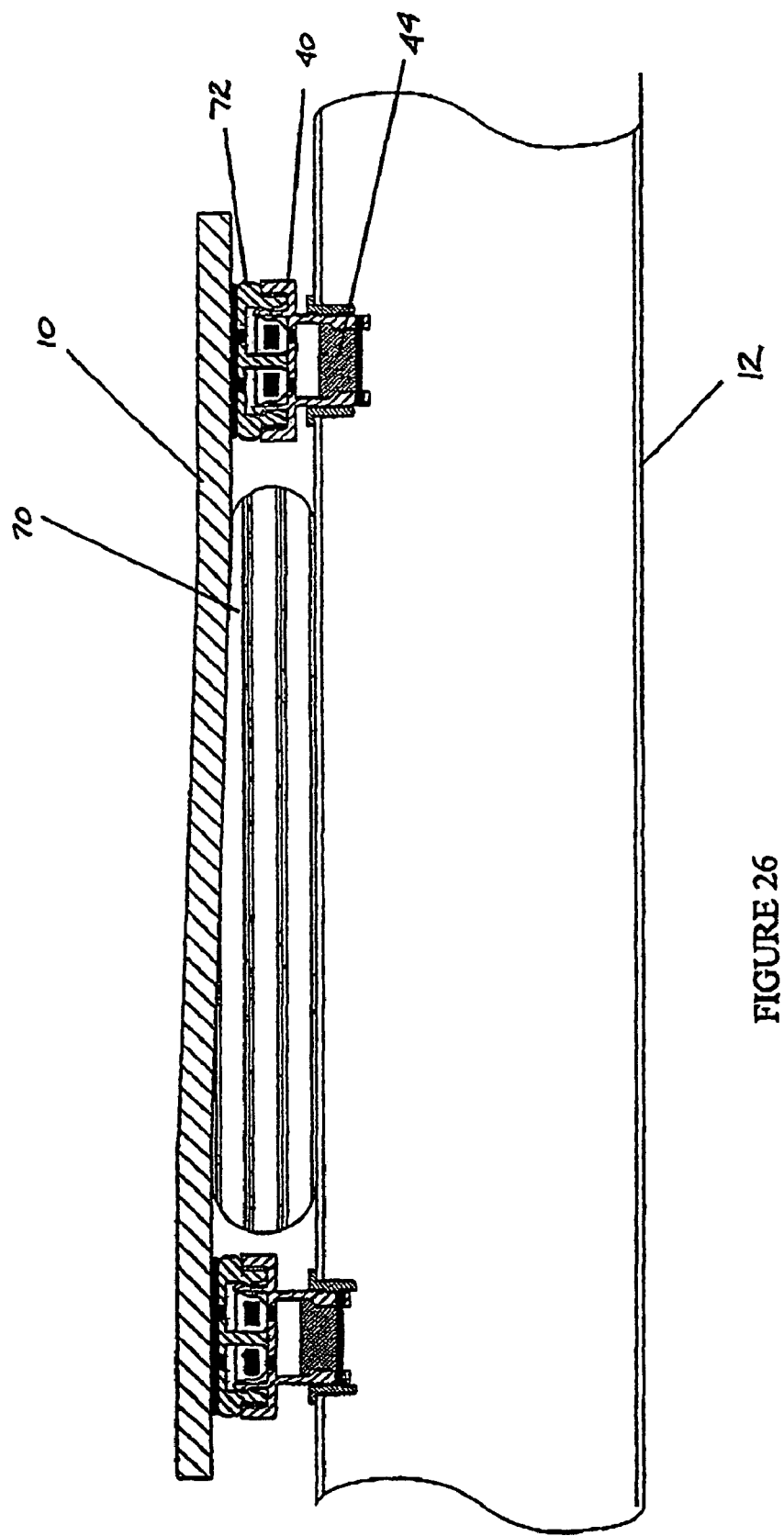

As before, fastener insert 14 is positioned within tubular steel frame 12 as in FIG. 19 and neck 42 is adjusted in position using locking pin 44. After panel 10 has been adhered to panel fastener 72, panel 10 is checked for correct positioning in relation to tubular steel frame 12, as in FIG. 21. Panel fastener 72 is then released from adjustable plate 40 as in FIG. 22 and FIG. 25. Adhesive 70 is deposited on tubular steel frame 12 and panel 10 and panel fastener 72 replaced and locked into position as shown in FIG. 26.

Figure 23:
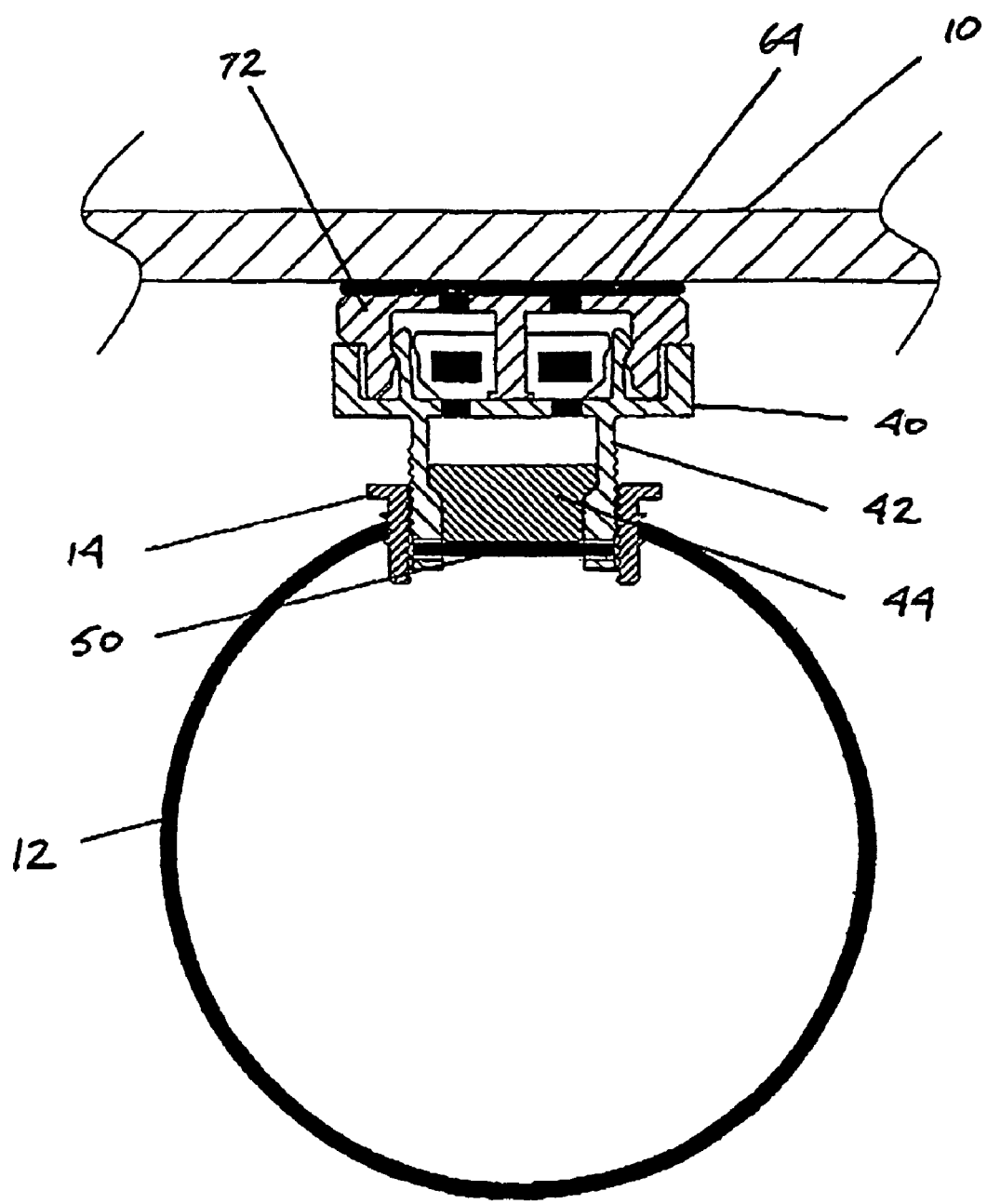
FIG. 23 is a close-up view of FIG. 21.

FIG. 27 shows this embodiment in top view and FIG. 28 shows it in side elevation. It will be appreciated that FIG. 26 is a longitudinal sectional view taken along the lines A—A of FIG. 27, while FIG. 23 is a cross-sectional view taken along the lines B—B of FIG. 28.

Figure 24:
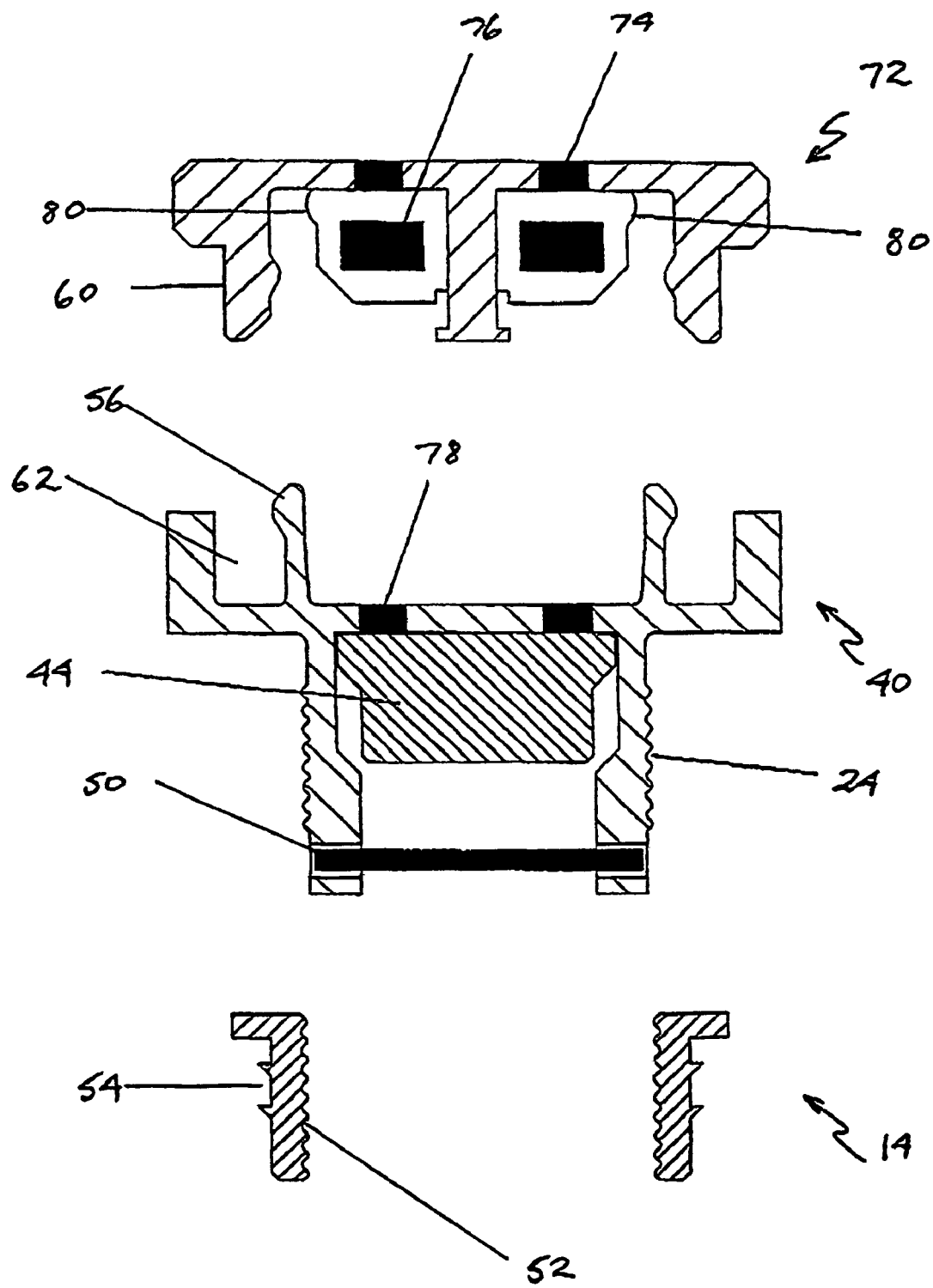
FIG. 24 is a magnified view of the third embodiment.
Figure 25:
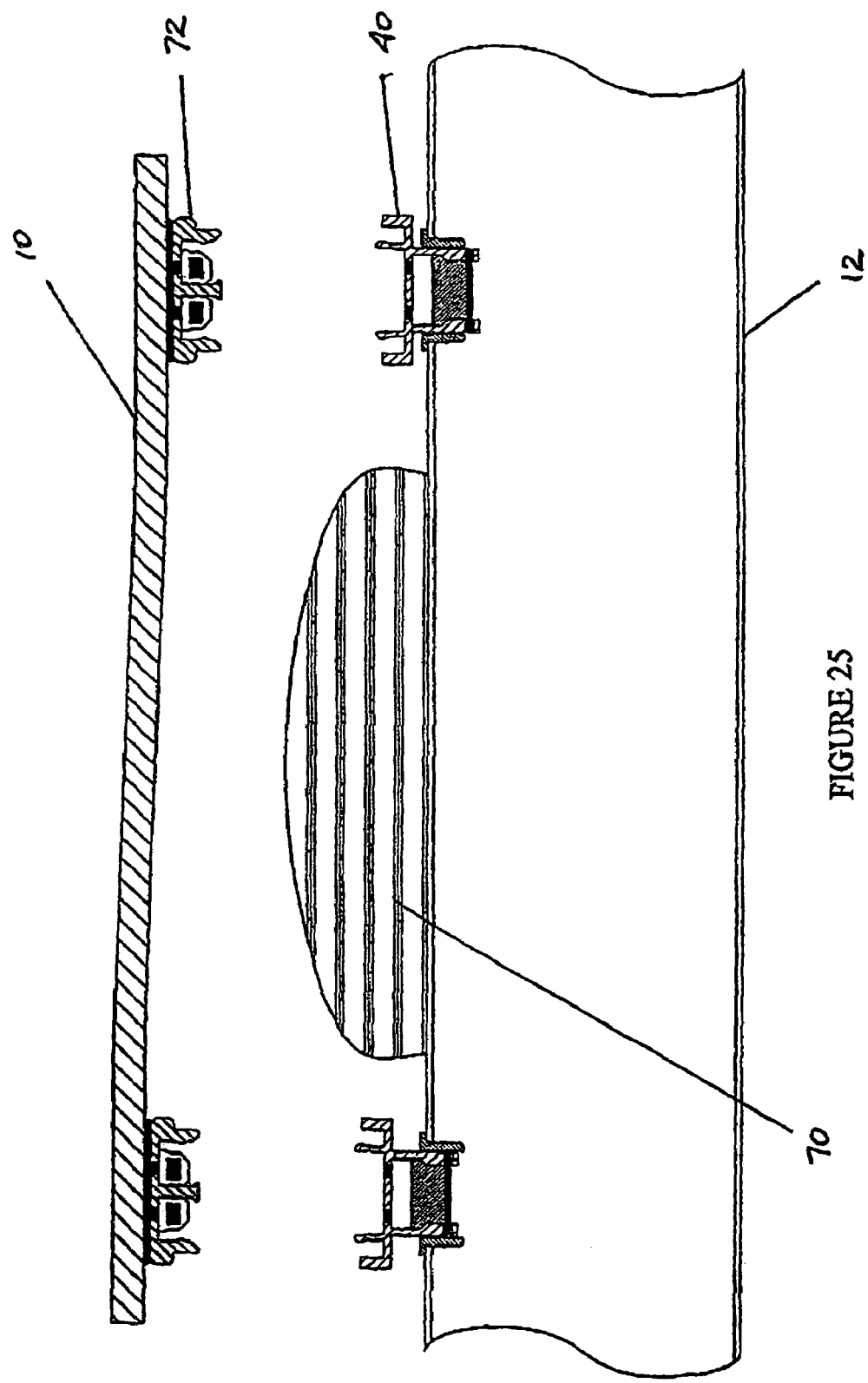
FIGS. 25 and 26 show the third embodiment in longitudinal cross-sectional view.

The detail of this embodiment can be seen from FIG. 24, which includes keepers 74, 76 and 78 as well as locking pins 80.

It will be appreciated by one skilled in the art that various changes may be made to the embodiments described and that other modifications may be effected without departing from the spirit and scope of the invention. For example, it is within the scope of the invention to have the adjustment means on the fastening means attached to the panel rather than to the tubular steel frame, as illustrated. It is also within the scope of the invention to have adjustment means on both fastening means.

INDUSTRIAL APPLICABILITY

The invention represents an important advance in jigging arrangements and is capable of making assembly line production far more accurate and efficient, while at the same time greatly reducing costs.

What is claimed is:

1. A jigging device for maintaining a first element in a spatial relationship to a second element, the device including:
   a first fastening means having two separate parts, namely:
      a first part for connection to the first element and including first coupling means, and
      a second part including adjustment means for adjusting the spatial relationship between the first and second elements, the second part also including second coupling means for engagement with the first coupling means:
   a second fastening means for connection to the second element; and
   a locking means adapted to assume a position in which the second part of the first fastening means is locked to the second fastening means, the locking means in the locked position being located within a portion of the second part of the first fastening means received within the second fastening means and adapted to press the received portion of the second part of the first fastening means outwardly against the second fastening means;
   wherein the first coupling means is adapted to be disengaged from the second coupling means while the second part of the first fastening means is locked to the second fastening means.

2. A jigging device as claimed in claim 1, wherein the first element is a panel for a vehicle and the second element is part of a tubular frame therefor, or wherein the second element is a panel for a vehicle and the first element is part of a tubular frame therefor.

3. A jigging device as claimed in claim 2, wherein the adjustment means is adapted to adjust the panel closer to or further away from the frame.

4. A jigging device as claimed in claim 2, wherein the adjustment means is adapted to adjust the panel so as to be closer to or further away from an adjacent panel.

5. A jigging device as claimed in claim 1, wherein the first and second fastening means, the adjustment means and/or the locking means are adapted to be manipulated manually.

6. A jigging device as claimed in claim 1, wherein the locking means can be activated, so as to be locked or unlocked, remotely.

7. A jigging device as claimed in claim 1, which includes two adjustment means, a first adjustment means included in the first fastening means and a second adjustment means included in the second fastening means.

8. A jigging device as claimed in claim 1, in which the fastening means is connected to the respective element by means chosen from the group consisting of: adhesive, a plate, a collar into which the fastening means is fitted, double-sided tape of suitable peel strength and moulding or forming the fastening means in or on the element.

9. A jigging device as claimed in claim 1, in which the adjustment means includes a series of serrations or a screw thread, in each case adapted to be received in a complementary shape.

10. A jigging device as claimed in claim 1, which includes intelligent means adapted to enable automated adjustment of the first element relative to the second element.

11. A jigging device as claimed in claim 10, in which the intelligent means is capable of sensing an undesirable gap and of automatically activating the adjustment means to close the gap so that it falls within a preset tolerance.

12. A jigging device as claimed in claim 1, wherein the first and second fastening means are circular in cross section.

13. A jigging device as claimed in claim 12, wherein the second part of the first fastening means has a ledge around its outer circumference and the first part of the second fastening means has a groove within its inner circumference adapted to receive the ledge.

14. A jigging device as claimed in claim 12, wherein the second part of the first fastening means has a plurality of external serrations adapted for receipt in internal serrations on the second fastening means.

15. A jigging device as claimed in claim 1, which further includes a stop to limit movement of the locking means.

16. A method for maintaining a first element in spatial relationship to a second element, the method including the steps of:
 1. providing a first fastening means having two separate parts, namely:
  a first part for connection to the first element and including first coupling means, and
  a second part including adjustment means for adjusting the spatial relationship between the first and second elements, the second part also including second coupling means for engagement with the first coupling means;
 2. connecting the first part of the first fastening means to the first element;
 3. connecting a second fastening means to the second element;
 4. adjusting the spatial relationship of the first element to the second element via the adjustment means;
 5. engaging the first and second coupling means; and
 6. causing a locking means to move to a position within the first fastening means in which the second part of the first fastening means is locked to the second fastening means, the locking means in the locked position being located within a portion of the second part of the first fastening means received within the second fastening means and adapted to press the received portion of the second part of the first fastening means outwardly against the second fastening means.

17. The jigging method claimed in claim 16, which includes a further step of connecting the first element to the second element.

18. The jigging method claimed in claim 17, wherein the first element is connected to the second element by adhesion or welding.

19. The jigging method of claim 16, wherein the first element is a panel for a vehicle and the second element is part of a tubular frame therefor, or wherein the second element is panel for a vehicle and the first element is part of a tubular frame therefor.

20. The jigging method claimed in claim 16, wherein the step of locking the first fastening means to the second fastening means is carried out remotely.

21. The jigging method of claim 16, wherein the step of adjusting the spatial relationship of the first element to the second element via adjustment means is carried out automatically.

* * * * *